United States Patent
Lee et al.

(10) Patent No.: US 9,241,358 B2
(45) Date of Patent: Jan. 19, 2016

(54) WIRELESS NETWORK CONFIGURATION METHOD AND SYSTEM FOR SMART APPLIANCE

(71) Applicants: UNIVERSAL SCIENTIFIC INDUSTRIAL (SHANGHAI) CO., LTD., Shanghai (CN); UNIVERSAL GLOBAL SCIENTIFIC INDUSTRIAL CO., LTD., Nantou County (TW)

(72) Inventors: Chun-Huang Lee, Nantou County (TW); Meng-Hsiu Kuo, Nantou County (TW)

(73) Assignees: UNIVERSAL SCIENTIFIC INDUSTRIAL (SHANGHAI) CO., LTD., Shanghai (CN); UNIVERSAL GLOBAL SCIENTIFIC INDUSTRIAL CO., LTD., Nantou County (TW)

( * ) Notice: Subject to any disclaimer, the term of this patent is extended or adjusted under 35 U.S.C. 154(b) by 162 days.

(21) Appl. No.: 14/146,545

(22) Filed: Jan. 2, 2014

(65) Prior Publication Data
US 2015/0139025 A1 May 21, 2015

(30) Foreign Application Priority Data
Nov. 15, 2013 (TW) .............................. 102141788 A

(51) Int. Cl.
*H04W 76/02* (2009.01)
*H04W 12/06* (2009.01)
*H04W 48/20* (2009.01)
*H04W 88/06* (2009.01)
*H04W 84/12* (2009.01)

(52) U.S. Cl.
CPC ............ *H04W 76/021* (2013.01); *H04W 12/06* (2013.01); *H04W 48/20* (2013.01); *H04W 84/12* (2013.01); *H04W 88/06* (2013.01)

(58) Field of Classification Search
CPC . H04W 76/021; H04W 76/02; H04W 76/023; H04W 48/20; H04W 48/16
USPC ......... 370/254, 255, 310, 328, 338, 351, 389, 370/395.1, 395.2, 395.3; 455/403, 422.1, 455/435.1, 435.2
See application file for complete search history.

(56) References Cited

U.S. PATENT DOCUMENTS

| | | | |
|---|---|---|---|
| 2004/0110530 A1* | 6/2004 | Alone et al. | 455/552.1 |
| 2009/0147700 A1* | 6/2009 | Sewall et al. | 370/254 |
| 2013/0039352 A1 | 2/2013 | Ruster et al. | |
| 2013/0173794 A1* | 7/2013 | Agerbak et al. | 709/225 |
| 2014/0362991 A1* | 12/2014 | Ebrom | 380/270 |

\* cited by examiner

*Primary Examiner* — Obaidul Huq
(74) *Attorney, Agent, or Firm* — Muncy, Geissler, Olds & Lowe, P.C.

(57) ABSTRACT

A wireless network configuration method and system for a smart appliance, wherein the smart appliance can start a client mode and an AP mode to connect with a wireless network AP and a portable electronic device separately. When the smart appliance established the connection with the wireless network AP, it will switch from the AP mode to a hidden SSID mode automatically. If an SSID and password of the access point have been stored in the portable electronic device, the portable electronic device will transmit these data to the smart appliance to simplify the operation for wireless network configuration. Besides, the smart appliance will keep connecting with the portable electronic device and disappearing in an available wireless network list of the portable electronic device in the hidden SSID mode. The advantages of this invention are full function and ease of operation.

4 Claims, 2 Drawing Sheets

WIRELESS NETWORK CONFIGURATION METHOD AND SYSTEM FOR SMART APPLIANCE

BACKGROUND OF THE INVENTION

1. Technical Field

The present invention relates to smart appliances capable of wireless network connection, and more particularly, to a configuration method and system for using a portable electronic product to configure the smart appliances for connection with a wireless network, thereby having advantages, such as ease of use and quick configuration.

2. Description of Related Art

Due to a surge of networking applications, electrical appliances used at home, such as air conditioners, refrigerators, and shower heaters, are increasingly capable of network connection which can be coupled with cloud computing to turn the home appliances into smart appliances easy to operate and potential to energy saving. Hence, there is presently a fast-growing market of smart appliances.

In general, home appliances are equipped mostly with a small-sized display unit or do not even have one. Alternatively, home appliances are installed at a place where users find it difficult o operate the home appliances by hand. As a result, it is inconvenient for the users to perform complicated network configuration of smart appliances. In view of the drawback of the prior art, US2013/0039352 discloses a wireless network configuration method for use with smart appliances, wherein, before it has been connected to a wireless network, an Internet-accessible device is configured to operate in an access point mode (AP mode, or infrastructure mode) so as for a portable electronic device to connect, by a point-to-point connection, to the Internet-accessible device to be configured, such that a user can control wireless network configuration operation carried out with the Internet-accessible device, using a display unit and an operation interface of the portable electronic device.

However, the network configuration operation requires the user to manually key in a service set identifier (SSID) of an intended wireless network and thereby results in inconvenience of operating. Furthermore, after finishing the configuration operation and thus connecting the Internet-accessible device to the wireless network, the user can switch the Internet-accessible device to a client mode in which the portable electronic device is prevented from searching for the Internet-accessible device by scanning existing wireless networks so as to preclude overly complicated visual presentation on the display unit of the portable electronic device. However, doing so comes with a disadvantage, i.e., it is unable to connect the portable electronic device to the Internet-accessible device directly; instead, the portable electronic device is connected to the Internet-accessible device via a wireless network, thereby bringing inconvenience in remote control operation.

In the situation where a user has many smart appliances (ie, the Internet-accessible device) each connected to a household wireless network, if the SSID of the household wireless network is changed by the user or the connection to the household wireless network is interrupted, the smart appliances will switch to the AP mode, and in consequence the user will have to perform wireless network configuration of the smart appliances one by one from the portable electronic device and will cause much more inconveniently.

BRIEF SUMMARY OF THE INVENTION

In view of the aforesaid drawbacks of the prior art, it is an objective of the present invention to provide a wireless network configuration method and system adapted for use with a smart appliance and characterized by enhanced ease of use and application to scenarios in which a plurality of smart appliances is in use.

To this end, the present invention provides a wireless network configuration method for a smart appliance. The method comprises the steps of: step a) turning on a smart appliance to start an access point mode (AP mode) automatically when the smart appliance fails to get connected to a wireless network (especially when the smart appliance lacks a display unit for configuration or when the smart appliance is positioned in such a manner as to render operation difficult), and create a connection to a portable electronic device; step b) using the portable electronic device to exercise remote control and choose a wireless network access point (wireless network AP) intended to create a connection to the smart appliance, wherein, if a service set identifier (SSID) and a login password of the wireless network AP are stored in the portable electronic device, the portable electronic device will send the SSID and the login password to the smart appliance automatically, otherwise a user will manually enter the SSID and the login password of the wireless network AP into the portable electronic device which will then send the SSID and the login password to the smart appliance; and step c) attempting to create a connection to the wireless network AP upon receipt of the SSID and the login password of the wireless network AP by the smart appliance, and switching from the AP mode to a hidden SSID mode automatically by the smart appliance upon completion of connection, such that the smart appliance remains connected to the portable electronic device but is not on an available wireless network list of the portable electronic device.

The present invention further provides a smart appliance wireless network configuration system for use with the aforesaid method. The system comprises: a wireless network access point (wireless network AP); a smart appliance being connectable to the wireless network AP, starting an access point mode (AP mode) upon failure to create a connection to the wireless network AP, and switching from the AP mode to a hidden SSID mode automatically upon connection to the wireless network AP; and a portable electronic device connectable to the smart appliance to exercise remote control over the smart appliance and send a stored service set identifier (SSID) and a stored login password of the wireless network AP to the smart appliance automatically, wherein, after switching from the AP mode to the hidden SSID mode, the smart appliance remains connected to the portable electronic device but is not on an available wireless network list of the portable electronic device.

Therefore, given an SSID and a login password which are stored in a portable electronic device in advance, a use can perform the wireless network configuration operation of a smart appliance quickly. Even if the wireless network AP is changed, it will be necessary to change only the configuration data stored in the portable electronic device, thereby dispensing with the hassle of keying in related data repeatedly. Furthermore, upon completion of the wireless network configuration operation, the smart appliance is not only connected to the wireless network AP but also starts a hidden SSID mode and maintains a direct connection to the portable electronic device. Hence, the portable electronic device always exercises remote control over the smart appliance, and the connection therebetween will not be interrupted even if the wireless network AP fails. Last but not least, the present invention

DETAILED DESCRIPTION OF THE INVENTION

Figure 1:
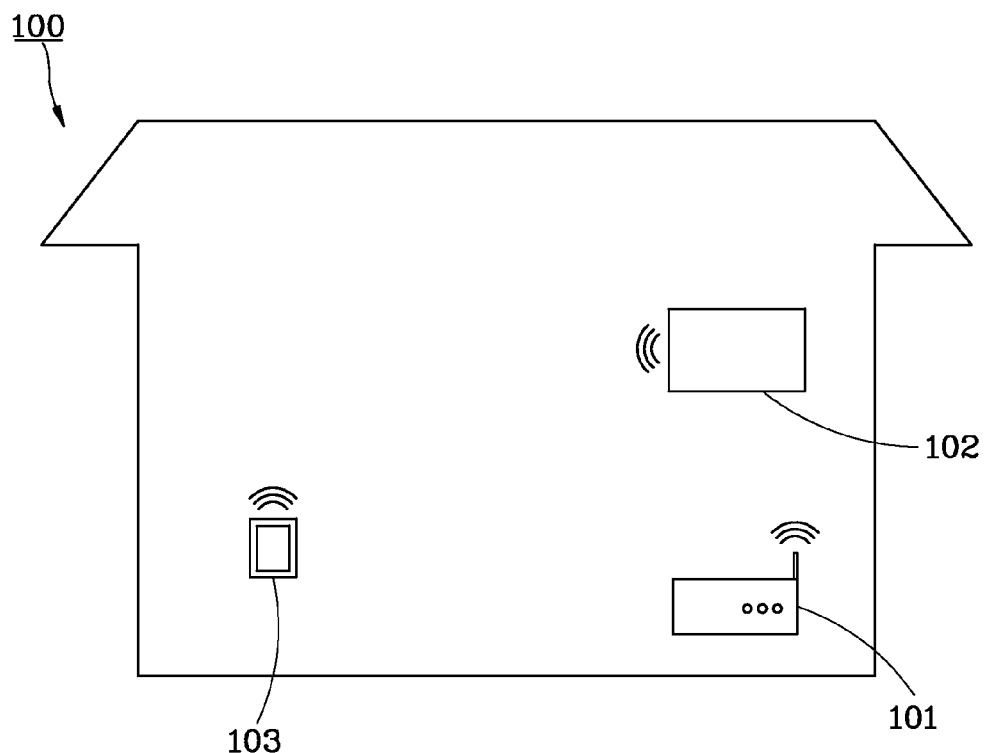
FIG. 1 is a schematic view of a wireless network configuration system according to a preferred embodiment of the present invention.

Referring to FIG. 1, the present invention provides a wireless network configuration system 100 for a smart appliance. The system 100 comprises a wireless network access point (wireless network AP) 101, a smart appliance 102 connectable to the wireless network AP 101, and a portable electronic device 103 connectable to the smart appliance 102. In this embodiment, the smart appliance 102, which is an air conditioner, has an embedded control unit and a wireless unit (not shown), and can create a connection to the wireless network AP 101 as well as the portable electronic device 103 simultaneously. The portable electronic device 103, such as a mobile device, a wearable computing device, an information appliance, a laptop, a cellular phone, a tablet or the like, means a device or an appliance which has a display unit and an input interface, and is installed with a mobile application (App) executable to implement the system 100 of the present invention and enable a user to perform wireless network configuration.

Figure 2:
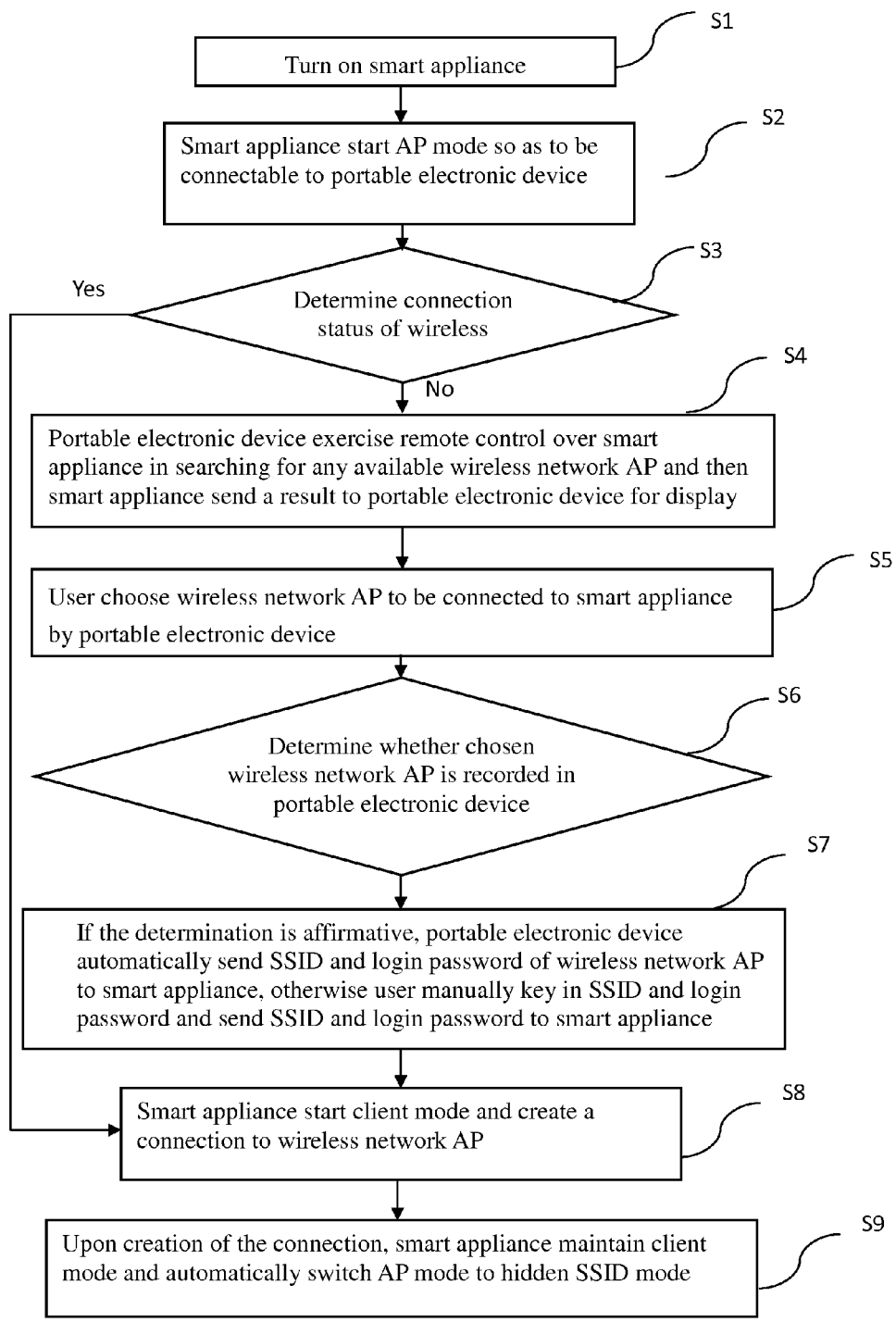
FIG. 2 is a flow chart of a wireless network configuration method according to a preferred embodiment of the present invention.

The present invention is characterized in that the wireless network system 100 performs wireless network configuration of the smart appliance 102. Referring to FIG. 2, there is shown a flow chart of a wireless network configuration method according to a preferred embodiment of the present invention. The process flow of the method is described below. In step S1, the user turn on the smart appliance 102. In step S2, the smart appliance 102 starts an access point mode (AP mode) automatically so as to be connectable to the portable electronic device 103. At this point in time, the portable electronic device 103 conducts a wireless network search for the smart appliance 102. Once the portable electronic device 103 finds the smart appliance 102 and confirms having stored a service set identifier (SSID) and a login password of the wireless network AP 101, the portable electronic device 103 will automatically create a connection to the smart appliance 102, otherwise the user will have to manually key in the SSID and the login password in order for the portable electronic device 103 to connect with the smart appliance 102. Afterward, the smart appliance 102 carries out step S3, by determining the connection status of the wireless network, that is, determining whether a connection to the wireless network AP 101 can be smoothly created. If the smart appliance 102 determines that no connection to the wireless network is possible, the process flow of the method will go to step S4 which involves performing wireless network configuration of the smart appliance 102.

In step S4, the user uses the portable electronic device 103 to exercise remote control over the smart appliance 102 in searching for any available said wireless network AP 101, and then the smart appliance 102 sends a result to the portable electronic device 103 for display. Afterward, in step S5, with the portable electronic device 103, the user chooses the wireless network AP 101 to be the target of network connection to the smart appliance 102. In step S6, the portable electronic device 103 determines whether the SSID and the login password of the wireless network AP 101 are stored in the portable electronic device 103. In step S7, the portable electronic device 103 sends the SSID and the login password to the smart appliance 102 automatically, otherwise the portable electronic device 103 requests the user to manually key in the SSID and the login password of the wireless network AP 101 so as to send the SSID and the login password of the wireless network AP 101 to the smart appliance 102.

After the smart appliance 102 has received the SSID and the login password of the wireless network AP 101, the process flow of the method goes to step S8. In step S8, the smart appliance 102 starts a client mode and creates a connection to the wireless network AP 101. Upon completion of the creation of the connection between the smart appliance 102 and the wireless network AP 101, the process flow of the method goes to step S9. In step S9, the smart appliance 102 maintains the client mode and switches from the AP mode to a hidden SSID mode automatically, such that the smart appliance 102 remains connected to the wireless network AP 101 and the portable electronic device 103 simultaneously but is not on the available wireless network list of the portable electronic device 103.

Therefore, the user stores the SSID and the login password of the household wireless network AP 101 in the portable electronic device 103 in advance or performs the storage operation while configuring the connection between the portable electronic device 103 and the wireless network AP 101 so as to speed up the wireless network configuration operation of the smart appliance 102. In case of a change of the household wireless network AP 101, it will be necessary to change only the configuration data stored in the portable electronic device 103, thereby dispensing with the hassle of keying in related data repeatedly. Furthermore, upon completion of the wireless network configuration operation, the smart appliance 102 is not only connected to the wireless network AP 101 but also maintains its direct connection with the portable electronic device 103; hence, not only is the portable electronic device 103 always exercising remote control over the smart appliance 102, but the connection therebetween will not be interrupted even if the wireless network AP 101 fails.

After confirming the feasibility to connect to the wireless network AP 101 in step S3, the smart appliance 102 executes step S8 right away to start the client mode and create a connection to the wireless network AP 101.

In conclusion, a wireless network configuration system according to the present invention is characterized in that: a portable electronic device functions as a means of exercising remote control over a smart appliance and sending a stored SSID and a stored login password of a wireless network AP to the smart appliance automatically to thereby spare users hassles; and, after getting connected, the smart appliance starts a hidden SSID mode to preclude overly complexity of an available wireless network list of the portable electronic device.

What is claimed is:

1. A wireless network configuration method for a smart appliance, the method comprising the steps of:
    a) turning on a smart appliance to start an access point mode (AP mode), and create a connection to a portable electronic device;
    b) using the portable electronic device to exercise remote control and choose a wireless network access point (wireless network AP) intended to create a connection to the smart appliance, wherein, if a service set identifier (SSID) and a login password of the wireless network AP are stored in the portable electronic, device, the portable electronic device will send the SSID and the login password to the smart appliance; and c) attempting to create a connection to the wireless network AP upon receipt of the SSID and the login password of the wireless network AP by the smart appliance, and switching from the AP mode to a hidden SSID mode automatically by the smart appliance upon completion of connection, such that the smart appliance remains connected to the portable electronic device but is not on an available wireless network list of the portable electronic device.

2. The method of claim 1, wherein, in step c), the smart appliance starts a client mode for creating a connection to the wireless network AP and switches from the AP mode to the hidden SSID mode automatically without ending the client mode.

3. The method of claim 2, wherein, in step b), the portable electronic device exercises remote control over the smart appliance for conducting a wireless network search and then sending a result to the portable electronic device.

4. The method of claim 1, wherein, in step a), the portable electronic device conducts awireless network search for the smart appliance and creates a connection to the smart appliance automatically after finding the smart appliance and confirming having stored the SSID and the login password of the smart appliance.

* * * * *